United States Patent
Kennedy

(10) Patent No.: US 11,662,043 B2
(45) Date of Patent: May 30, 2023

(54) PIPE CONNECTOR CAM RING AND GRIPPER

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 17/862,839

(22) Filed: Jul. 12, 2022

(65) Prior Publication Data
US 2022/0341522 A1   Oct. 27, 2022

Related U.S. Application Data

(63) Continuation of application No. 16/996,544, filed on Aug. 18, 2020.

(51) Int. Cl.
| | | |
|---|---|---|
| *F16L 37/18* | (2006.01) | |
| *F16L 21/08* | (2006.01) | |
| *F16L 27/113* | (2006.01) | |

(52) U.S. Cl.
CPC ............. *F16L 21/08* (2013.01); *F16L 27/113* (2013.01)

(58) Field of Classification Search
CPC ......... F16L 37/18; F16L 37/101; F16L 37/12; F16L 37/122; F16L 37/16; F16L 21/007
USPC ................... 285/394, 395, 396, 358
See application file for complete search history.

(56) References Cited

U.S. PATENT DOCUMENTS

| | | | | |
|---|---|---|---|---|
| 377,988 A | * | 2/1888 | Bowers ................. | F16L 21/002 |
| | | | | 285/286.1 |
| 996,023 A | * | 6/1911 | McAdoo ............. | F16L 13/0227 |
| | | | | 285/286.1 |
| 1,069,904 A | * | 8/1913 | Sanders ................ | F16L 37/101 |
| | | | | 285/314 |
| 1,477,440 A | * | 12/1923 | Grier, Jr. ................ | F16L 37/101 |
| | | | | 279/71 |
| 1,533,875 A | * | 4/1925 | McCleary ............... | E21B 35/00 |
| | | | | 292/37 |
| 2,463,179 A | * | 3/1949 | Iftiger, Sr. ........... | F16L 37/1215 |
| | | | | 285/314 |

(Continued)

OTHER PUBLICATIONS

Hymax Grip, retrieved from https:l/www.waterworld.com/home/video/16267350/pipe-coupling-and-flange-adaptor, Jun. 30, 2014.

*Primary Examiner* — Aaron M Dunwoody
(74) *Attorney, Agent, or Firm* — Brown & Michaels, PC

(57) ABSTRACT

A cam ring for a pipe connector includes a first axial side, a second axial side opposite the first axial side, a radially outward-facing side, a radially inward-facing side, and a cam element extending a circumferential length along the radially inward facing-side. The cam element includes a first cam section and a second can section, the cam sections respectively have first and second radially facing cam surfaces adjacent respective first and second axially facing cam surfaces. The second radially facing cam surface has a second radial depth lesser than a first radial depth of the first radially facing cam surface. The second axially facing cam surface has a second axial location closer to the first axial side than a first axial location of the first axially facing cam surface. A gripper for a pipe connector includes a body and teeth with an arc shape.

7 Claims, 10 Drawing Sheets

(56) References Cited

U.S. PATENT DOCUMENTS

| | | | | |
|---|---|---|---|---|
| 3,083,042 | A | * | 3/1963 | Collar .................... F16L 37/101 |
| | | | | 285/349 |
| 4,632,437 | A | * | 12/1986 | Robson ................. F16L 37/101 |
| | | | | 285/309 |
| 4,733,438 | A | * | 3/1988 | Stupakis ................. F16L 33/22 |
| | | | | 24/19 |
| 6,179,346 | B1 | * | 1/2001 | Robson ................. F16L 37/101 |
| | | | | 285/321 |
| 6,494,502 | B1 | * | 12/2002 | Plante .................... F16L 37/18 |
| | | | | 285/280 |
| 6,511,100 | B1 | * | 1/2003 | Le Clinche ............. F16L 37/23 |
| | | | | 403/322.2 |
| 7,243,955 | B2 | | 7/2007 | Krausz et al. |
| 7,748,753 | B2 | | 7/2010 | Krausz et al. |
| 9,890,884 | B1 | | 2/2018 | Chiproot |
| 10,281,075 | B2 | * | 5/2019 | Hontz .................... F16L 37/122 |
| 2011/0210543 | A1 | * | 9/2011 | German ................ F16L 21/007 |
| | | | | 285/330 |
| 2017/0284574 | A1 | * | 10/2017 | Crompton ............... F16L 21/08 |
| 2018/0135788 | A1 | * | 5/2018 | Hontz ................... F16L 37/138 |
| 2019/0063654 | A1 | * | 2/2019 | Unger ................... F16L 37/101 |
| 2019/0072216 | A1 | * | 3/2019 | Kang ..................... F16L 21/04 |
| 2022/0057028 | A1 | * | 2/2022 | Kennedy ................ F16L 21/08 |

* cited by examiner

PIPE CONNECTOR CAM RING AND GRIPPER

REFERENCE TO RELATED APPLICATIONS

This application is a continuation application of co-pending U.S. patent application Ser. No. 16/996,544, filed Aug. 18, 2020, entitled "Pipe Connector". U.S. patent application Ser. No. 16/996,544 is incorporated herein by reference.

BACKGROUND OF THE INVENTION

Field of the Invention

The invention pertains to the field of pipe connectors. More particularly, the invention pertains to a pipe connector and a method to connect pipes.

Description of Related Art

The installation of some pipe connectors requires insertion of an end of a pipe into a body of the pipe connector. To avoid decoupling of the pipe from the pipe connector, some sort of retention mechanism physically holds the pipe end in the body, and to avoid leaks, some sort of sealing mechanism creates a fluid-tight seal between the pipe and the body. The retention mechanism and the sealing mechanism often have separate structural or functional aspects requiring separate implementation, or producing insufficient levels of retention or sealing.

One retention and sealing mechanism includes threading the end of the pipe into a threaded portion of the body. This solution requires both threading the pipe and rotating the pipe or the body to seat the connection, a requirement that can be a problem when either or both of the elements cannot be rotated, or if for some reason the pipe cannot be threaded.

Another retention and sealing mechanism includes a compression fitting, the use of which includes inserting a pipe through a seal and an externally threaded body, and then rotating an internally threaded collar onto the body to compress the seal against the outside of the pipe. Nothing more than the compression of the seal around the pipe holds the pipe in place though, so that the pipe can pull out of the fitting when fluid pressure is supplied in the pipe.

More complex pipe connectors are known, but such connections usually require a plurality of tightening elements, or separate sealing and retention operations that are difficult for one-handed tightening of the connection.

SUMMARY OF THE INVENTION

A pipe connector to connect to an end of a pipe or pipe fitting provides a single tightening operation to create both a fluid-tight seal and a strong physical connection.

In some embodiments, a pipe connector includes a body, a cam ring, a seal element, a push ring, and a gripper. The body has a pocket section, the pocket section having an outer surface, an inner surface around an interior bore, and an aperture passing from the outer surface through the inner surface. The cam ring is configured to be located around the outer surface of the pocket section, the cam ring including an axis, a first axial side, a second axial side opposite the first axial side, a radially outward-facing side, a second attachment element on the radially outward-facing side, a radially inward-facing side, and a cam element extending a circumferential length along a portion of the radially inward facing-side. The cam element includes a first end having a first depth from the inward-facing side toward the outward-facing side and a first axial location relative to the first axial side of the cam ring, and a second end having a second depth and a second axial location relative to the first axial side of the cam ring, the second depth less than the first depth, the second axial location closer to the first axial side of the cam ring than the first axial location. The seal element is configured to be seated around the inner surface of the pocket section. The push ring is configured to be slideably located within the interior bore of the pocket section. The gripper is configured to be located through an aperture in the pocket section and into the first depth of the cam element. The gripper includes a body having a first end and a second end, the first end configured to be located within the first depth of the cam ring, the second end configured to be located within the interior bore of the pocket section and contoured to mate with an outer surface of the pipe. When the body, the cam ring, the seal element, the push ring, and the gripper are assembled, when a pipe is inserted into the pipe connector, and when the cam ring is rotated from a first position toward a second position, the gripper moves from the first axial location to the second axial location to move the push ring against the seal element to seal between the seal element and the pipe, and the gripper moves from the first depth to the second depth to grip the pipe.

In some embodiments, a cam ring for a pipe connector includes a first axial side, a second axial side opposite the first axial side, a radially outward-facing side, a radially inward-facing side, and a cam element extending a circumferential length along a portion of the radially inward facing-side. The cam element includes a first cam section at a first end of the circumferential length, the first cam section having a first depth from the inward-facing side toward the outward-facing side, and having a first axial location relative to the first axial side. The cam element also includes a second cam section at a second end of the circumferential length, the second cam section having a second depth from the inward-facing side toward the outward-facing side, and having a second axial location relative to the first axial side, the second depth less than the first depth, the second axial location closer to the first axial side than the first axial location.

In some embodiments, a gripper for a pipe connector includes a body and a plurality of teeth. The body has a first side, a second side adjacent the first side, a third side adjacent the first side and opposite the second side, and a fourth side adjacent the second side and the third side and opposite the first side. The plurality of teeth extend from the fourth side of the body, each of the teeth of the plurality of teeth having arc shape to grip a cylinder.

DETAILED DESCRIPTION OF THE INVENTION

Figure 1:
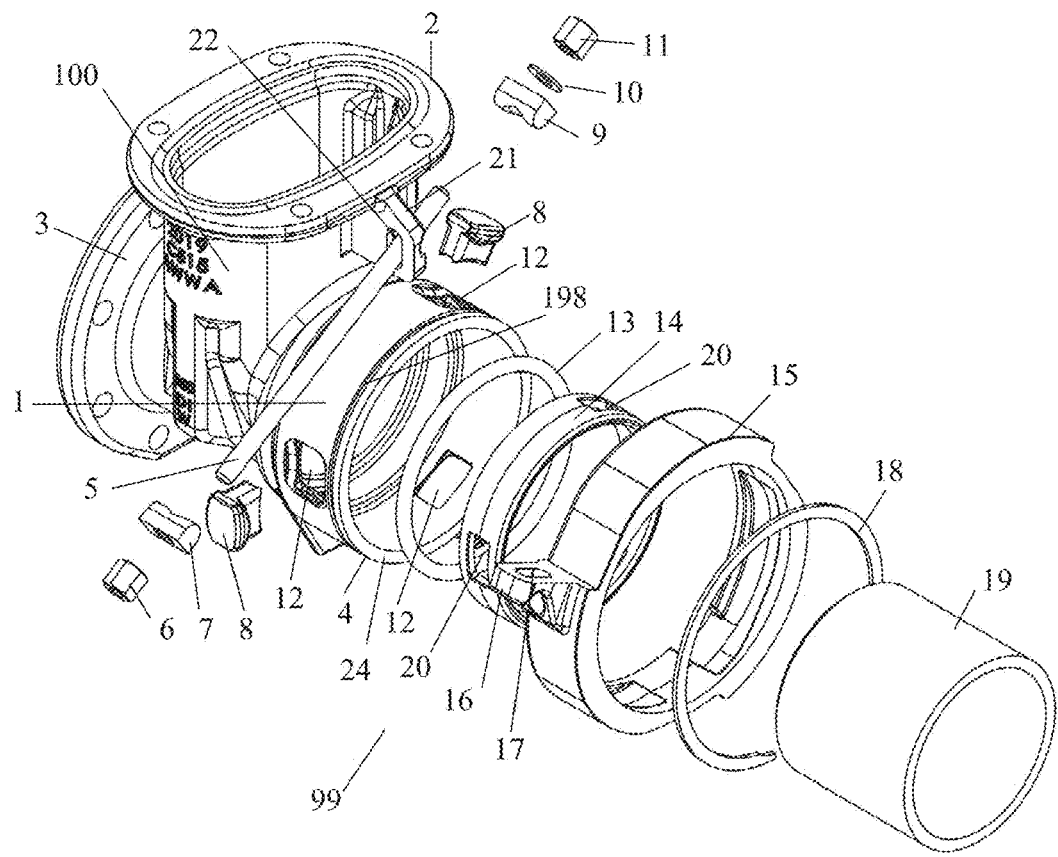
FIG. 1 shows an exploded view of a valve including a pipe connector, according to an embodiment of the invention.
Figure 8:
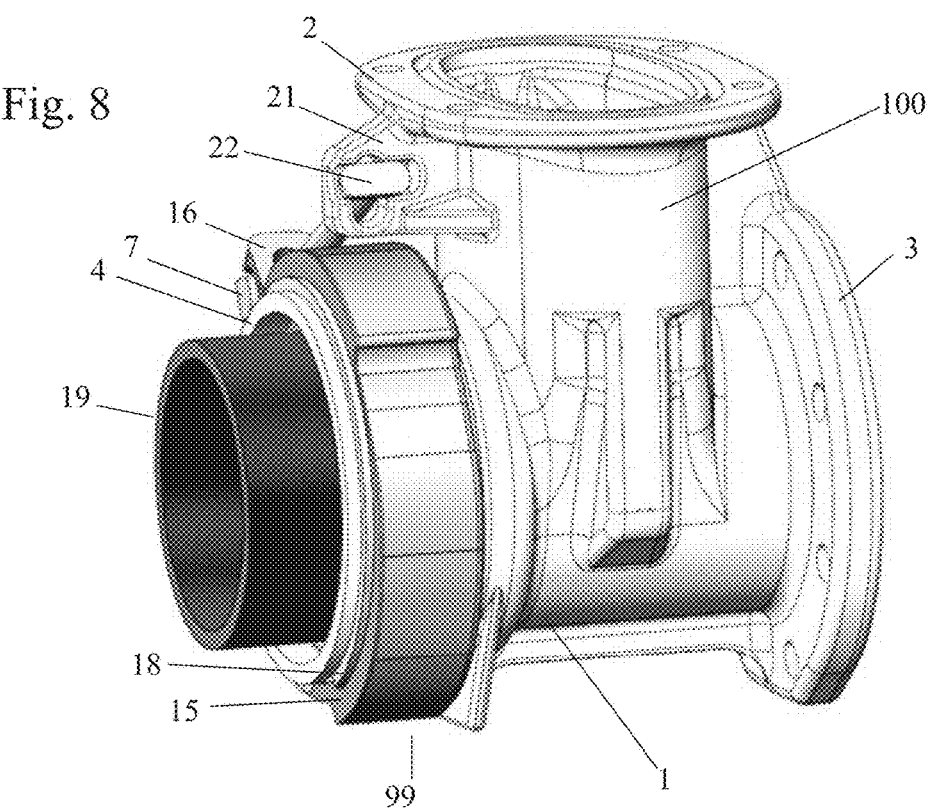
FIG. 8 shows a perspective view of the valve and pipe connector of FIG. 1.
Figure 2:
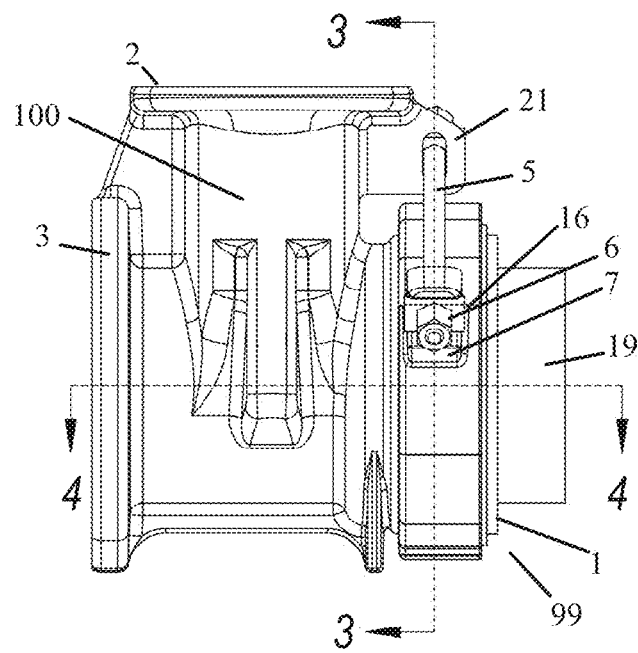
FIG. 2 shows a side view of the valve and pipe connector of FIG. 1, with the pipe connector in a first position.
Figure 3:
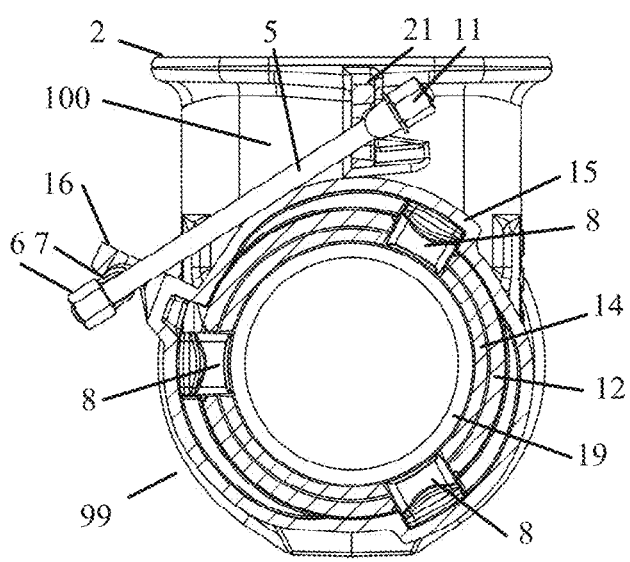
FIG. 3 shows a cut-through view of the valve and pipe connector of FIG. 1, along the lines 3-3 in FIG. 2.
Figure 4:
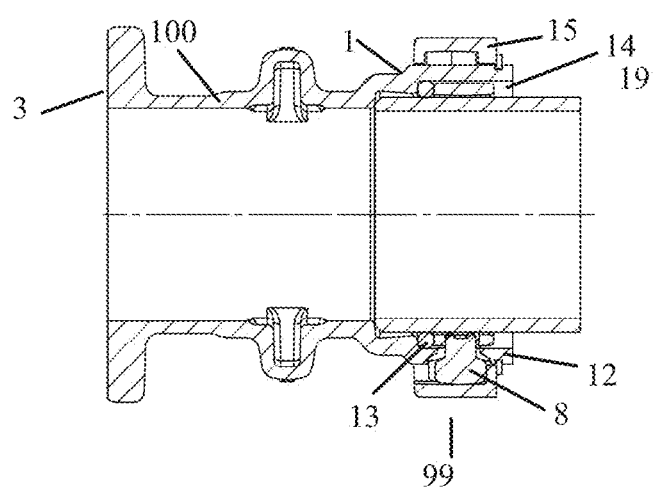
FIG. 4 shows a cut-through view of the valve and pipe connector of FIG. 1, along the lines 4-4 in FIG. 2.

FIG. 1 shows an exploded view of a valve 100 including a pipe connector 99, according to an embodiment of the invention, while FIG. 8 shows a perspective view of the valve 100 and the pipe connector 99 with a pipe 19 inserted into the pipe connector 99. The pipe connector 99, while shown integrated as part of the valve 100, can be implemented as part of a variety of valves, adapters, couplings, or other piping or plumbing fittings and applications. Accordingly, the operational components of the valve 100, which are not relevant to the inventive pipe connector 99, are omitted from the drawings and the following description.

Components of the Pipe Connector

Referring to FIGS. 1-16b, the pipe connector 99 provides a fluid seal and mechanical connection between a body 1 of the pipe connector 99 and a pipe or conduit 19. The body 1 is integrated with the valve 100 as shown herein, but may also be integrated with some other sort of device as noted above.

Figure 9:
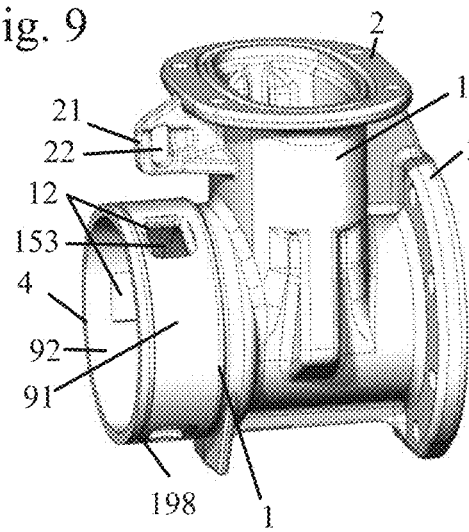
FIG. 9 shows a perspective view of a body of the valve and pipe connector of FIG. 1.

FIG. 9 shows a perspective view of the valve 100 and the body 1 of the pipe connector 99. The valve 100 shown in the figures has a first flange 3 for connection to other components such as a tank or a flanged pipe, and a top cover flange 2 for mounting the operational components of the valve 100. As noted above, the operational and mounting components are part of the specific valve 100 that is shown in the drawings as an example, and the operational and mounting components do not form part of the novel pipe connector 99.

The body 1 has a pocket section 4 sized substantially congruent to the pipe 19, with an outer surface 91 facing radially outward, an inner surface 92 facing radially inward, and an interior bore 150 sized to receive a push ring 14 and the pipe 19, as discussed below. A groove 153 can be provided around, and/or cut into, the inner surface 92 of the pocket section 4 to receive a seal element 13 that ultimately makes a seal between the pipe 19 and the inner surface 92 of the pocket section 4. An outside groove 198 (FIG. 19a) can be provided on the outer surface 91 of the pocket section 4 to receive a retainer ring or snap ring 18, which can be installed after installation of a cam ring 10 to retain the cam ring 10 axially on the outer surface 91.

Apertures 12 pass from the outer surface 91 through the inner surface 92 and are radially arranged around the pocket section 4. The apertures 12 are sized such that when grippers 8 are inserted, the grippers 8 can move axially toward and away from the open end 24 of the pocket section 4, but are constrained against movement circumferentially. The drawings show three apertures 12, but it will be understood that other numbers of apertures could be provided within the teachings of the disclosure.

The body 1 or valve 100 is provided with a first attachment element configured to be engaged by a tightening element, which can be operated to grip and seal against the pipe 19. In the illustrated embodiment, the first attachment element is a bracket 21 adjacent to the pocket section 4, and the tightening element is an operating bolt assembly including an operating bolt 5, nuts 6, 11, t-fittings 7, 9, and a washer 10, as discussed further below. The bracket 21 is pierced by an opening 22 for accommodating an end of the operating bolt assembly.

Figure 10:
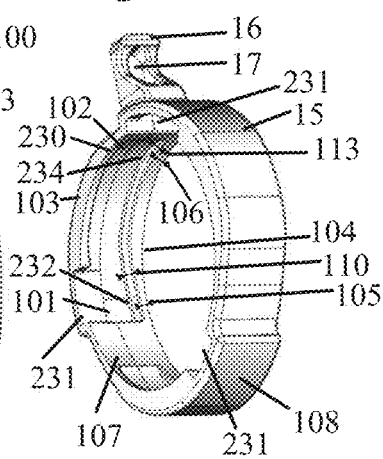
FIG. 10 shows a perspective view of a cam ring of the pipe connector of FIG. 1.

FIG. 10 shows a perspective view of a cam ring 15. A radially inward-facing side 107 of the cam ring 15 is provided with a plurality of cam elements 230 between a first axial side 103 and a second axial side 104 of the cam ring 15. The number of cam elements 230 matches the number of apertures 12 in the pocket section 4 of the body 1. Each cam element 230 extends a circumferential length along a portion of the radially inward-facing side 107 from a first end 101 to a second end 102. At the first end 101, each cam element 230 has a first depth 110 from the radially inward-facing side 107 toward a radially outward-facing side 108. Also at the first end 101, each cam element 230 has a first axial location 232 relative to the first axial side 103 of the cam ring 15, a distance 105 from the second axial side 104. At the second end 102, each cam element 230 has a second depth 113 from the inward-facing side 107 toward the radially outward-facing side 108. Also at the second end 102, each cam element 230 has a second axial location 234 relative to the first axial side 103 of the cam ring 15, a distance 106 from the second axial side 104. The second depth 113 is less than the first depth 110, such that as a gripper 8 moves from the first end 101 to the second end 102, the gripper 8 is moved radially inward toward the pipe 19. The second axial location 234 is also closer to the first axial side 103 of the cam ring 15 than the first axial location 232, such that as a gripper 8 moves from the first end 101 to the second end 102, the gripper 8 moves toward the first axial side 103 and the seal element 13 to compress the seal element 13. The gripper 8 moves relative to the cam ring 15 along the circumferential length of the cam element 230 from a first position at the first end 101 to a second position at the second end 102 by rotating the cam element 15.

Each cam element 230 is provided with an entry section 231 at the first end 101 passing between the first axial side 103 of the cam ring 15 and the first axial location 232 to pass a gripper 8 when the cam ring 15 is slid onto the outer surface 91 of the pocket section 4.

The cam ring 15 is provided with a second attachment element on the radially outward-facing side 108 of the cam ring 15 to engage with the tightening element, which when operated, draws the second attachment element toward the first attachment element and rotates the cam ring 15 to move each gripper 8 from the first end 101 to the second end 102 of the respective cam element 230. In the illustrated embodiment, the second attachment element is a bracket 16, which is pierced by an opening 17 for accommodating and end of the operating bolt assembly, which is discussed further below.

Figure 11:
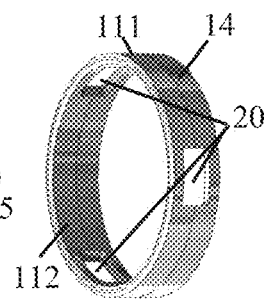
FIG. 11 shows a perspective view of a push ring of the pipe connector of FIG. 1.

FIG. 11 shows a perspective view of the push ring 14. The push ring 14 has an inner surface 112 sized to fit around the pipe 19, and an outer surface 111 sized to fit within the interior bore 150 of the pocket section 4 of the body 1. A number of apertures 20 are provided through the push ring 14, sized to fit the grippers 8 and aligned with the apertures 12 in the pocket section 4 of the body 1.

Figure 12:
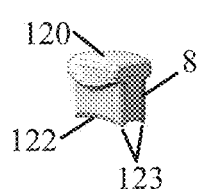
FIG. 12 shows a perspective view of a gripper of the pipe connector of FIG. 1.

FIG. 12 shows a perspective view of a gripper 8. The gripper 8 is configured to extend through the apertures 12 in the pocket section 4, through the apertures 20 in the push ring 14, and into the first depth 110 of the cam elements 230. The gripper 8 has an outer surface 120 that fits within the cam elements 230 of the cam ring 15, and has an inner end 122 curved to fit around the pipe 19. The inner end 122 can have teeth 123 to positively grip the pipe 19.

Figure 13:
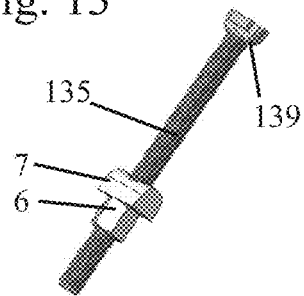
FIG. 13 shows a perspective view of a T-bolt assembly of the pipe connector of FIG. 1.

FIGS. 1 and 13 show perspective views of two options for an operating bolt assembly. In FIG. 1, the operating bolt 5 is a piece of threaded rod. Nuts 6, 11 are threaded onto opposite ends of the bolt 5, and t-fittings 7, 9 are slid onto the bolt 5 inward of the nuts 6, 11. A washer 10 facilitates rotation of the nut 11 over the t-fitting 7. T-fitting 7 is shaped to engage first bracket 16 on the cam ring, and t-fitting 9 is shaped to engage the bracket 21 on the body 1. T-fitting 7 can have a first curved surface, and the second bracket 21 can have a second curved surface congruent with the first curved surface such that the first curved surface pivots against the second curved surface as the t-fitting 7 and second bracket 21 are drawn toward the first bracket 16. Nuts 6, 11 form operating elements for the operating bolt 5, such that when either nut 6, 11 is rotated, the t-fittings 7, 9 are drawn together against brackets 16, 21, causing cam ring 15 to rotate, as described further below.

FIG. 13 shows a variation on the operating bolt. In this variation, threaded rod 5, nut 11, t-fitting 9 and washer 10 are replaced by a t-bolt 135 which has a t-shaped section 139 on the end which engages bracket 21. Nut 6 and t-fitting 7 are threaded onto the opposite end of the t-bolt 135, and engage bracket 16 on the cam ring 15. In this variation, the t-shaped section 139 is stationary, and the cam ring 15 is rotated by rotating nut 6, which forms a single operating element for the operating bolt.

Figure 14:
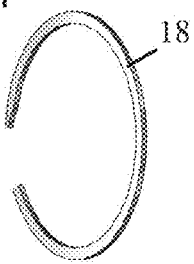
FIG. 14 shows a perspective view of a retainer ring of the pipe connector of FIG. 1.

FIG. 14 shows a perspective view of a retainer ring 18. The retainer ring 18 fits in groove 198 to retain the cam ring 15 on the pocket section 4. As shown in the figure, the retainer ring 18 can be a conventional "c clip", or any other design known in the art.

Assembly of the Pipe Connector

FIGS. 15*a* through 19*b* show the steps of assembling the pipe connector 99.

Figure 15A:
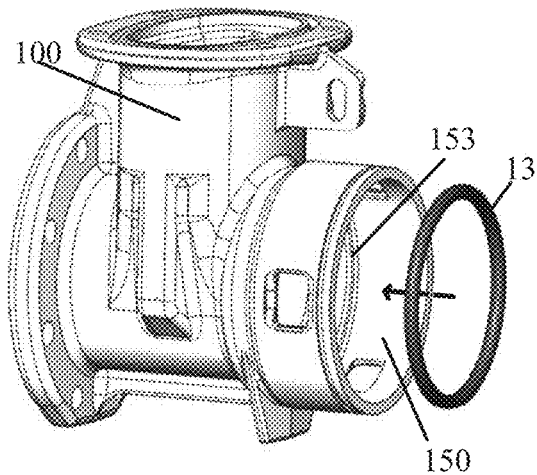
FIG. 15a through FIG. 20b show steps of assembling the pipe connector of FIG. 1.
Figure 15B:
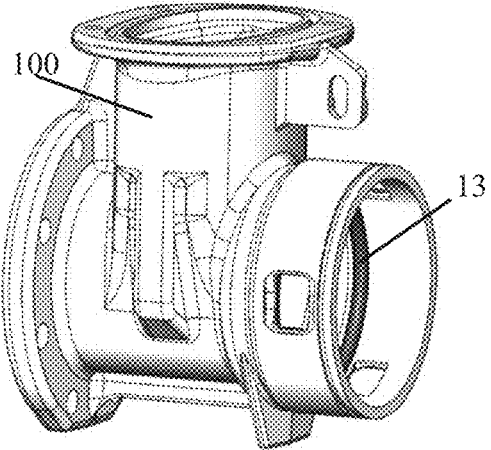

As shown in FIGS. 15*a*-15*b*, the seal element 13 is inserted into groove 153 inside the inner bore 150 of the pocket section 4 of the body 1.

Figure 16A:
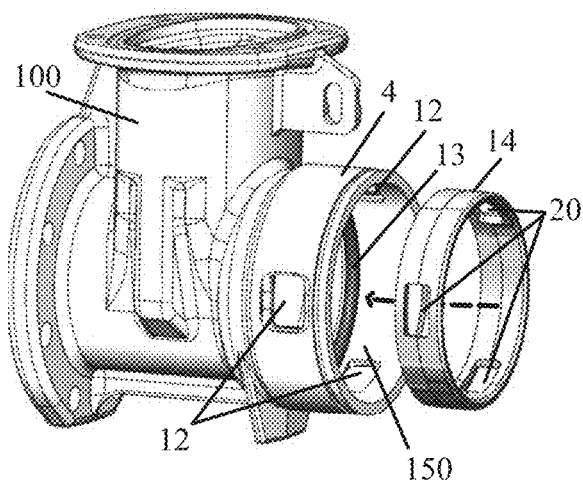
Figure 16B:
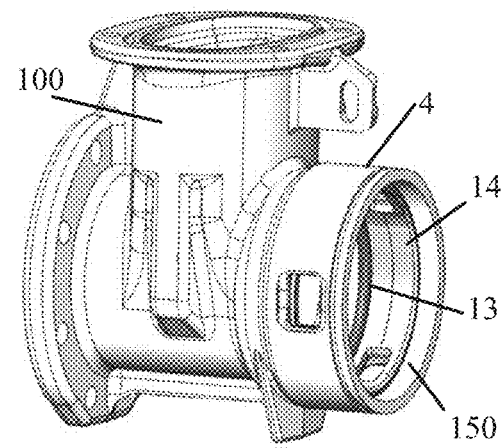

As shown in FIGS. 16*a*-16*b*, the push ring 14 is inserted into the inner bore 150 of the pocket section 4, with the apertures 20 in the push ring 14 aligned with the apertures 12 in the pocket section 4.

Figure 17A:
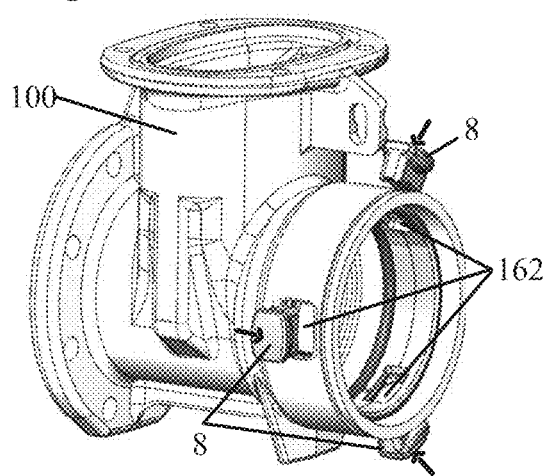
Figure 17B:
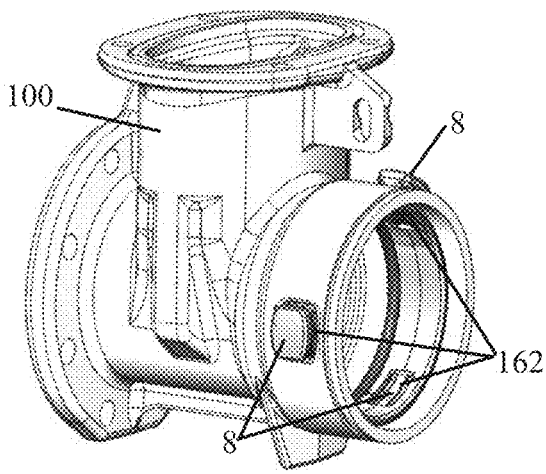

As shown in FIGS. 17*a*-17*b*, the grippers 8 are inserted into cavities 162 formed by the aligned apertures 12 in the pocket section 4 and apertures 20 in the push ring 14.

Figure 18A:
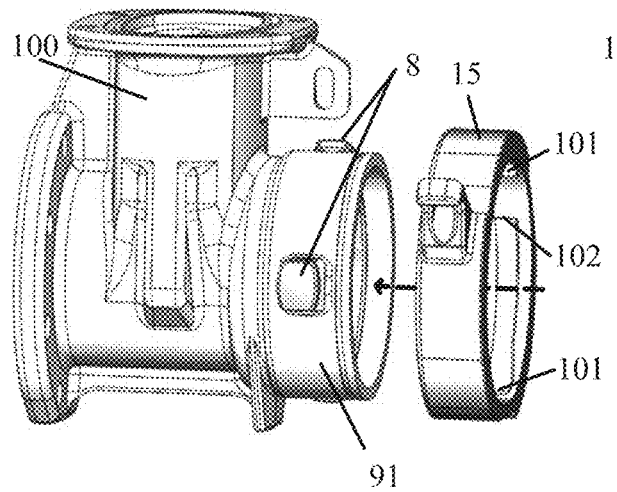
Figure 18B:
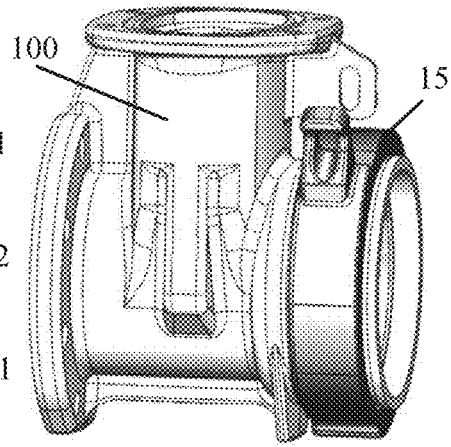

As shown in FIGS. 18*a*-18*b*, the cam ring 15 is assembled onto the outer surface 91 of the pocket section 4 of the body 1. The cam ring 15 is positioned such that the entry sections 231 of the cam surfaces 230 will fit over the grippers 8 in cavities 162, and such that the first bracket 16 on the cam ring 15 is properly aligned with the second bracket 21 on the body 1 for insertion of the operating bolt 5, in the step below.

Figure 19A:
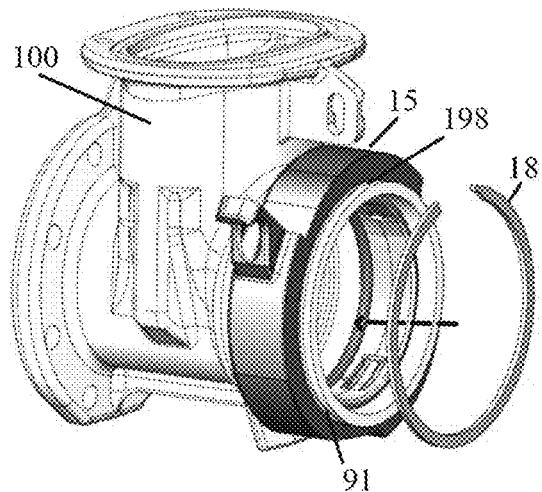
Figure 19B:
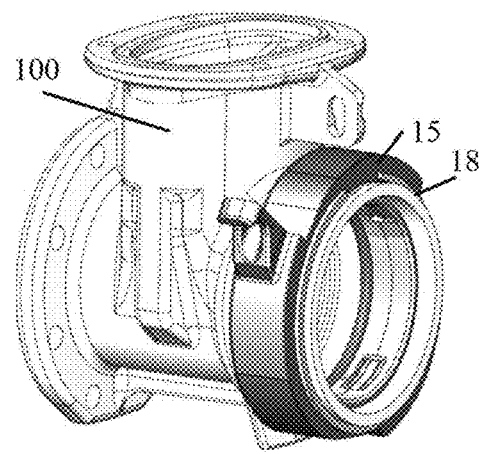

As shown in FIGS. 19*a* and 19*b*, the retaining ring 18 is placed into the groove 198 in the outer surface 91 of pocket section 4, retaining the cam ring 15 in place.

Figure 20A:
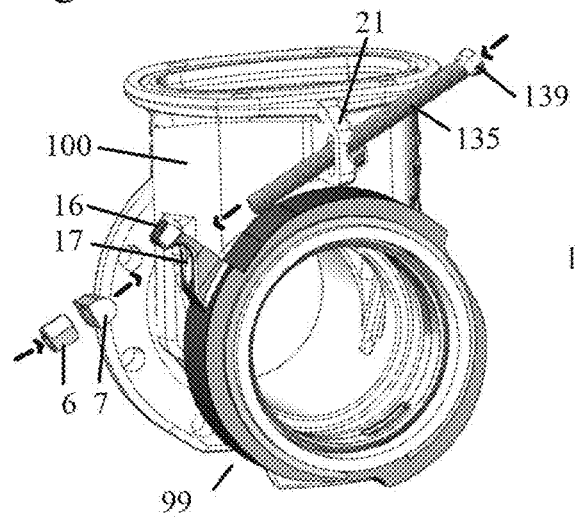
Figure 20B:
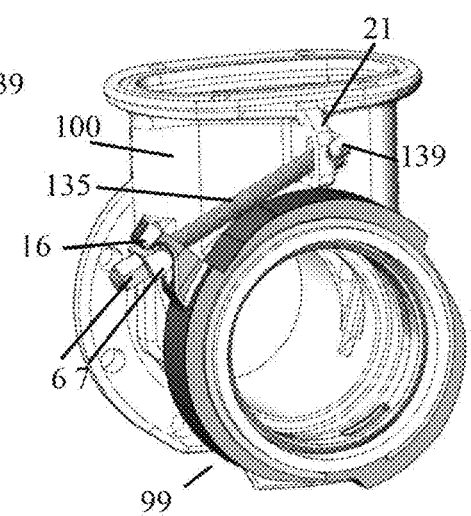

The operating bolt assembly is placed. In the example of FIGS. 20*a* and 20*b*, the t-bolt 135 is inserted through aperture 22 of the second bracket 21 so that t-shaped section 139 seats against the second bracket 21. The opposite end of the t-bolt 135 is inserted through aperture 17 in the first bracket 16 of the cam ring 15. T-fitting 17 is slid onto t-bolt 135 and seated against the first bracket 16, then nut 6 is threaded onto t-bolt 135, readying the pipe connector 99 for use.

Operation of the Pipe Connector

Figure 5:
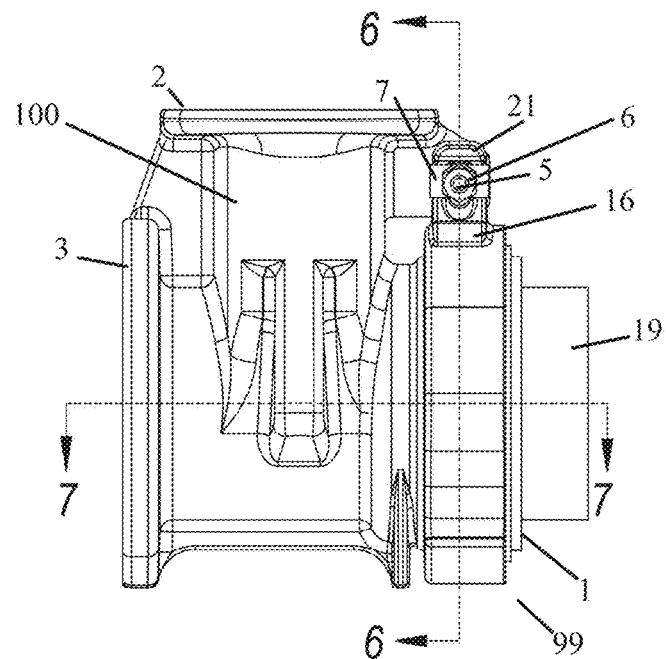
FIG. 5 shows a side view of the valve and pipe connector of FIG. 1, the pipe connector in a second position.
Figure 6:
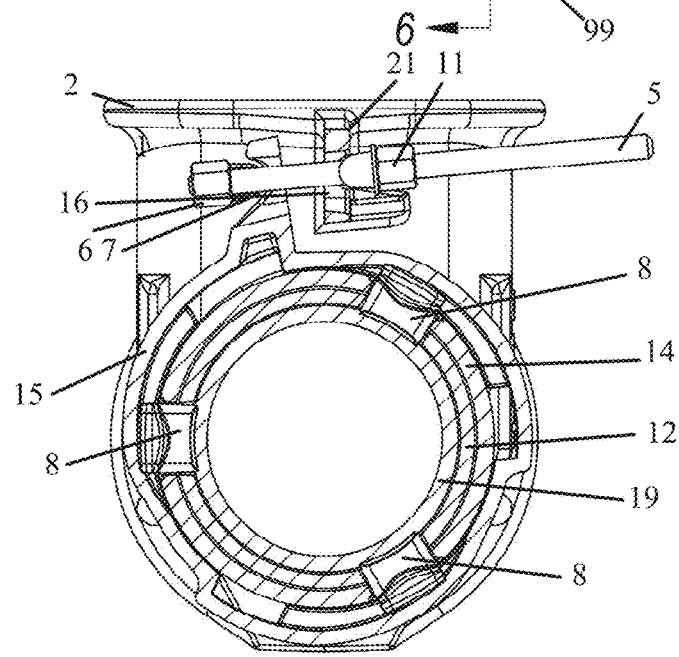
FIG. 6 shows a cut-through view of the valve and pipe connector of FIG. 1 along the lines 6-6 in FIG. 5.
Figure 7:
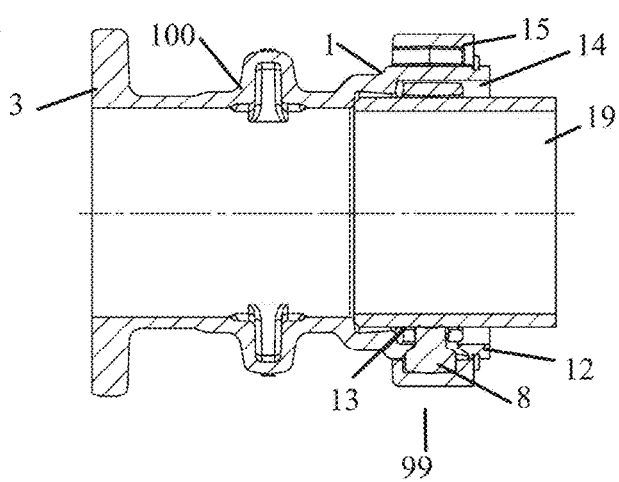
FIG. 7 shows a cut-through view of the valve and pipe connector of FIG. 1 along the lines 7-7 in FIG. 5.

FIGS. 2-4 and 21 show the valve 100 with pipe connector 99 in a first position, while FIGS. 5-7 show the valve 100 with the pipe connector 99 in a second position. In the first position, the pipe connector 99 is open for insertion of the pipe 19, and in the second position the pipe 19 is held in place and fluid-sealed.

Figure 21:
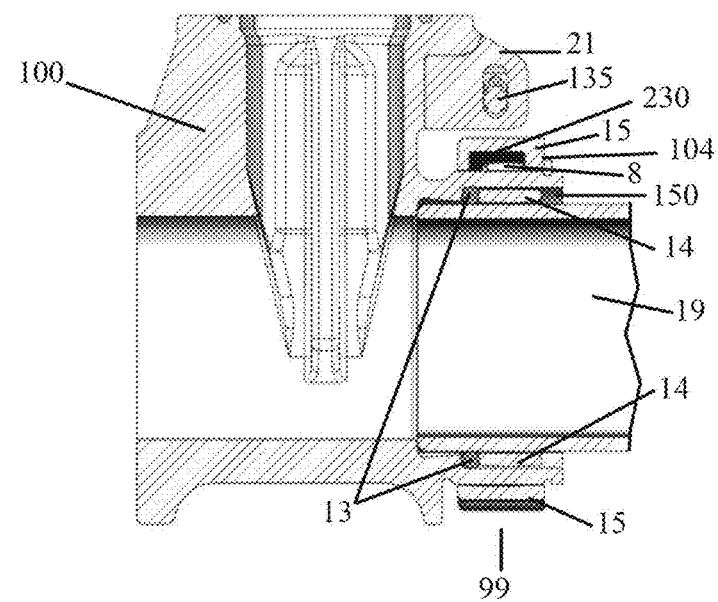
FIG. 21 shows a cut-through view of the valve and pipe connector of FIG. 1, with the pipe connector in the first position.

Referring to FIG. 21, which is a cut-through view, in the first position the seal element 13 is around the pipe 19, but is uncompressed. The grippers 8 are within the cam element 230 at the first end 101—at first axial location 232 and first depth 110—which is farthest radially outward within the cam element 230 and farthest from the first axial side 103 of the cam ring 15. The push ring 14 is similarly in a position that is farthest from the first axial side 103 of the cam ring 15.

Figure 22A:
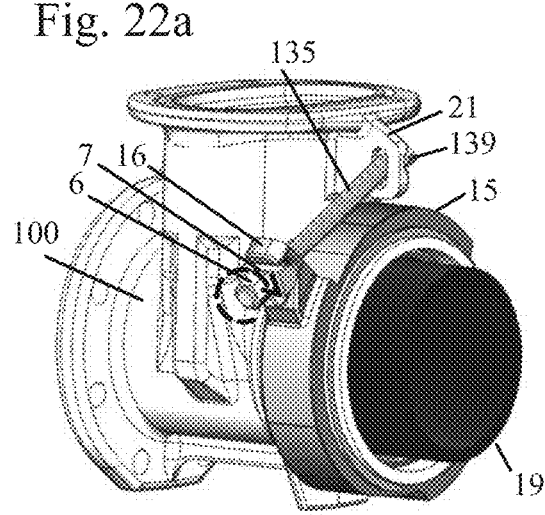
FIG. 22a shows a perspective view of the valve and pipe connector of FIG. 1, with the pipe connector in the first position.
Figure 22B:
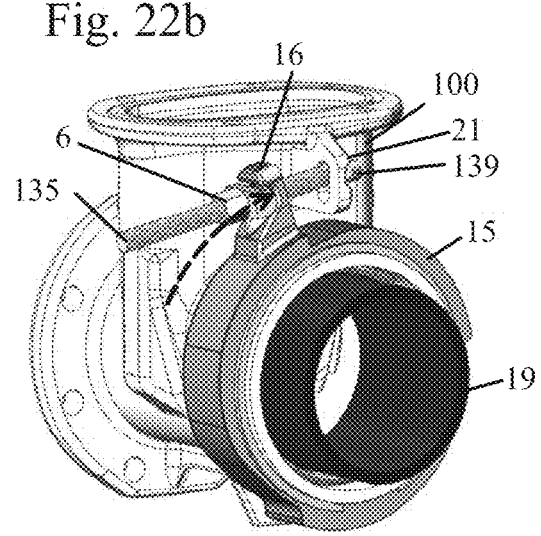
FIG. 22b shows a perspective view of the valve and pipe connector of FIG. 1, with the cam ring rotating to the second position.

FIG. 22*a* shows the valve 100 with a pipe 19 inserted into the pipe connector 99, and the cam ring 15 in the first position. When nut 6 is rotated around t-bolt 135, it presses t-fitting 7 against the first bracket 16 and t-fitting 139 against the second bracket 21, drawing the two brackets 16, 21 closer to each other. As shown in FIG. 22b, this operation causes the cam ring 15 to rotate toward the second position.

Figure 23A:
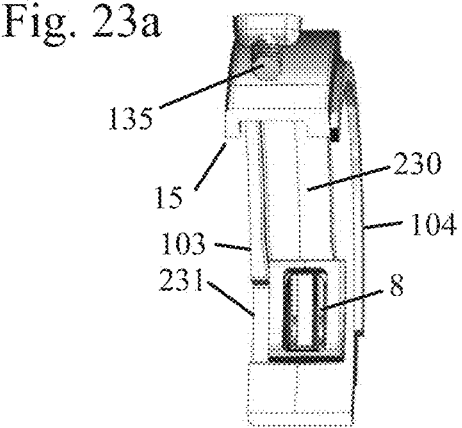
FIG. 23a shows a perspective view of the cam ring, the gripper, and the push ring of the pipe connector of FIG. 1 in the first position.
Figure 23B:
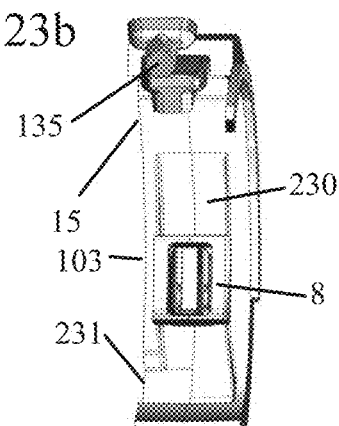
FIG. 23b shows a perspective view of the cam ring, the gripper, and the push ring of the pipe connector of FIG. 1, with the push ring rotating to the second position.
Figure 24A:
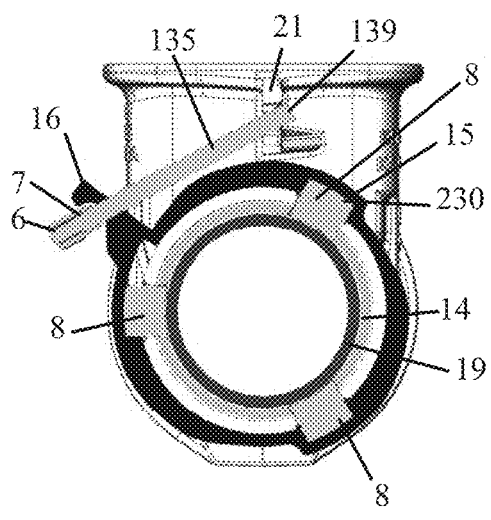
FIG. 24a shows a cut-through view of the pipe connector of FIG. 1 in the first position.
Figure 24B:
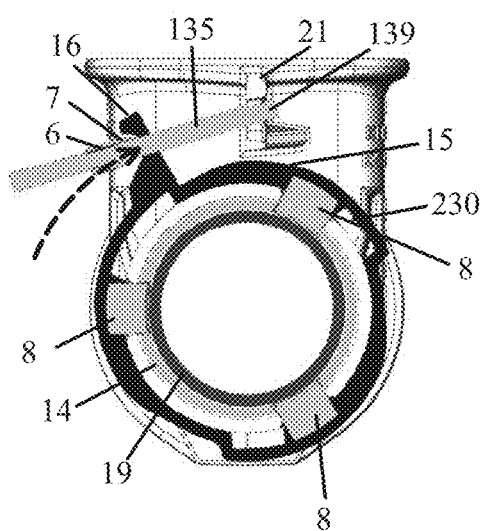
FIG. 24b shows a cut-through view of the pipe connector of FIG. 1, with the cam ring rotating to the second position.
Figure 25:
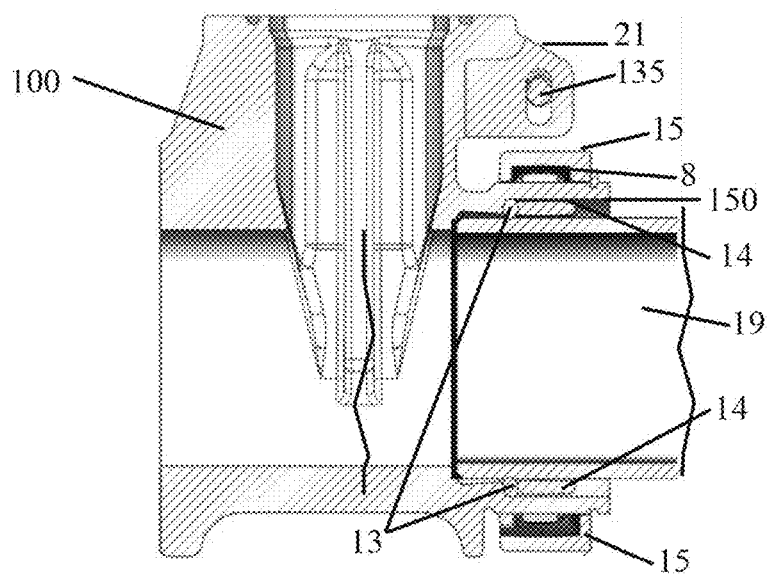
FIG. 25 shows a side cut-through view of the pipe connector of FIG. 1, with the seal element compressed.
Figure 26A:
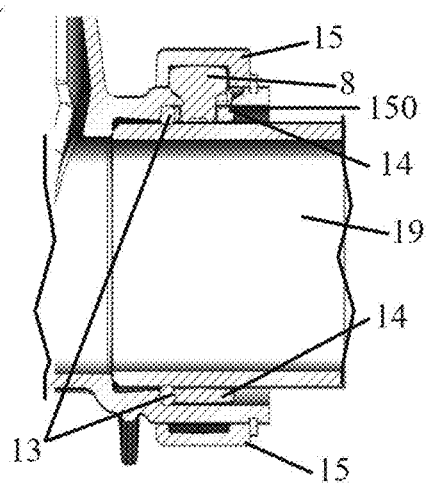
FIG. 26a shows a side cut-through view of the pipe connector of FIG. 1 in the first position.
Figure 26B:
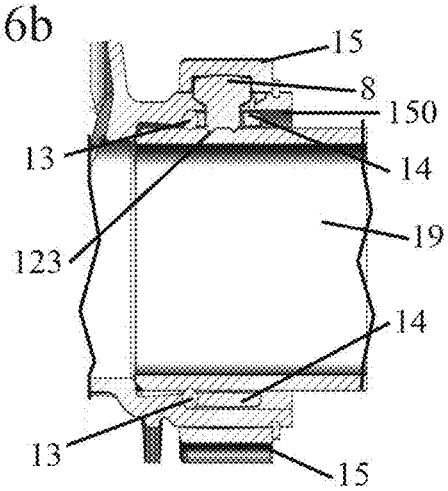
FIG. 26b shows a side cut-through view of the pipe connector of FIG. 1 in the second position with the gripper holding a pipe.

FIG. 23a shows a perspective view of the cam ring 15, a gripper 8, and the push ring 14 in the first position. FIGS. 24a and 26a show end and side cut-through views, respectively. As the cam ring 15 is rotated toward the second position, as shown in FIGS. 23b, 24b, and 26b, the gripper 8 is moved within the cam element 230, and the shape of the cam element 230 as described above urges the gripper 8 in two directions—axially toward the first axial side 103 of the cam ring 15, and radially inward toward the pipe 19. The axial movement of the grippers 8 also exerts an axial force to move the push ring 14 toward the first axial side 103, which compresses the seal element 13 as shown in FIG. 25. This compression of the seal element 13 tightens the seal element 13 around the pipe 19, to create a fluid-tight seal. With the same operation of the tightening element, the radially-inward movement of the grippers 8 force the teeth 123 of the grippers 8 into the pipe, physically and mechanically holding the pipe 19 in place within the body 1. The axial shift of the grippers 8 can occur before the radial shift of the grippers 8, or the full axial shift of the grippers 8 can occur before the full radial shift of the grippers 8, so that the seal element 13 can be sufficiently compressed before the grippers 8 bite on the pipe 9, the latter of which would restrict further axial shift of the grippers 8. Accordingly, when the grippers 8 move from the first ends 101 to the second ends 102 of the cam elements 230, a majority or all of the shift from the first axial location 232 to the second axial location 234 occurs before the completion of the radial shift from the first depth 110 to the second depth 113 is completed.

Further Embodiment(s) of the Pipe Connector

Figure 27:
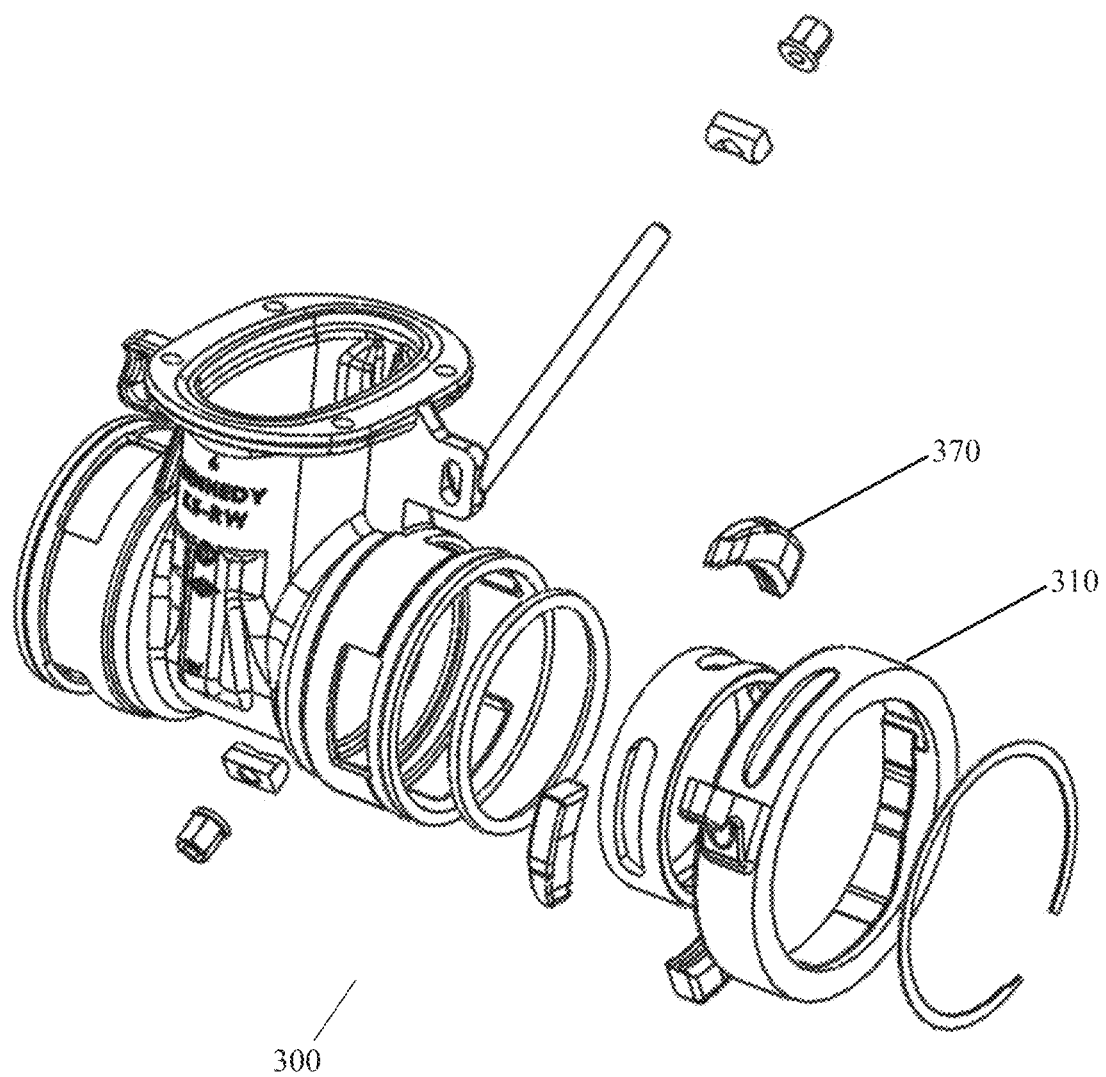
FIG. 27 shows an exploded perspective view of a pipe connector according to an embodiment.

FIG. 27 shows an exploded perspective view of a pipe connector 300 according to an embodiment. The pipe connector 300 includes a cam ring 310 and a gripper 370 that are alternative embodiments to the cam ring 15 and gripper 8. Other features of the pipe connector 300 are the same as the pipe connector 1 unless otherwise discussed.

Figure 28:
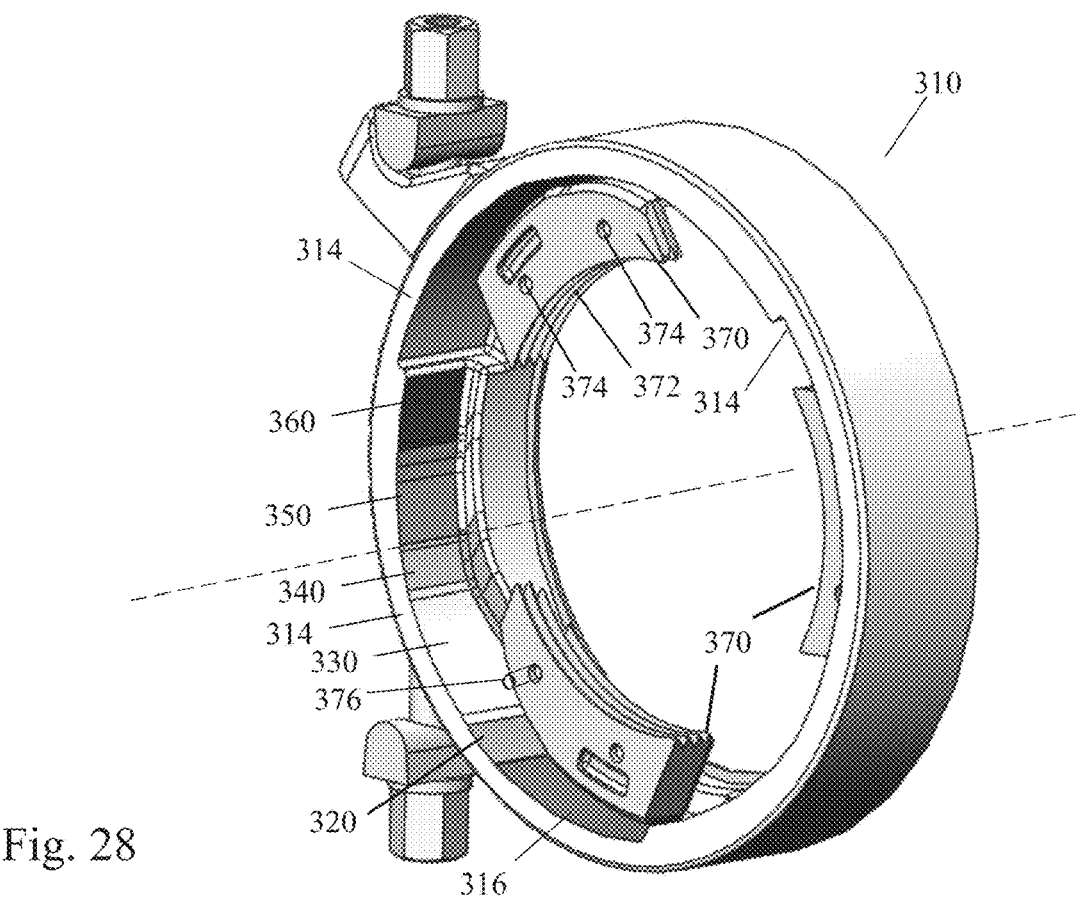
FIG. 28 shows a perspective view of a cam ring and a gripper, according to the embodiment of the pipe connector in FIG. 27.

FIG. 28 shows a perspective view of the cam ring 310 and the gripper 370. The cam ring 310 is similar to the cam ring 15, but each cam element 314 includes further cam sections each having different degrees of sloping and radial depth. A first cam section 316 has a first radial depth. The gripper 370 is at this first cam section 316 before the pipe 19 is inserted and gripped by the pipe connector 300. A second cam section 320 adjacent the first cam section 316 has a slope radially inward from the first cam section 316 at a relatively steep angle (relative to the slope of some of the other cam sections) in order to draw the gripper 370 close to the pipe 19 with short or minimal rotation of the cam ring 310. A third cam section 330 adjacent the second cam section 320 shifts axially from the second cam section 320, such that as the cam ring 310 rotates and the gripper 370 moves through the third cam section 330, the gripper 370 is pushed axially to compress the push ring 14 against the seal element 13. A fourth cam section 340 adjacent the third cam section 330 has a slope radially inward from the third cam section 330 at a shallow angle relative to the slope of other cam sections, such as the second cam section 320. The slope of the fourth cam section 340, when the cam ring 310 is rotated, begins wedging the gripper 370 into the pipe 19. A fifth cam section 350 adjacent the fourth cam section 340 has a slope radially inward from the fourth cam section 340 also at a relatively shallow angle relative to the slope angle of the second cam section 320. This slope of the fifth cam section 350 is configured to continue wedging the gripper 370 against the pipe 19 when pipe 19 is ductile iron or other similar hardness, compressing the gripper 370 against the ductile pipe to create a frictional force strong enough to hold the ductile pipe. A sixth cam section 360 adjacent the fifth cam section 350 includes a final slope radially inward from the fifth cam section 350 at a steep angle relative to the slope angle of the fifth cam section 350. This final slope is configured to wedge a plurality of teeth 372 of the gripper 370 into PVC pipe, or other pipe of similar hardness.

When the gripper 370 of FIG. 28 is at the first cam section 316 before a pipe 19 is in and gripped by the pipe connector 300, so that the pipe 19 can be inserted without interference from the gripper 370, the gripper 370 can be held at a minimum radially outward position. This minimum radially outward position corresponds with holes 374 in each gripper 370. The gripper 370 can have a body with a first side, a second side adjacent the first side, a third side adjacent the first side and opposite the second side, and a fourth side adjacent the second side and the third side and opposite the first side. Retention elements 376 made of plastic or other suitably soft but rigid material can be mounted in and extend from the holes 374, such that if the gripper 370 moves radially inward with light force (e.g., the force of gravity or less), the retention elements 376 then hit the push ring 14, which prevents further radially inward movement of the gripper 370 and prevents the gripper 370 from obstructing a path for the pipe 19 to be inserted within the pipe connector 300. After the pipe 19 is inserted into the pipe connector 300, when the cam ring 310 is rotated to move the gripper 370 axially, the applied force causes the retention elements 376 to rip or sheer off against the push ring 14, allowing the gripper 370 to continue moving radially inward to grip the pipe 19.

Figure 29:
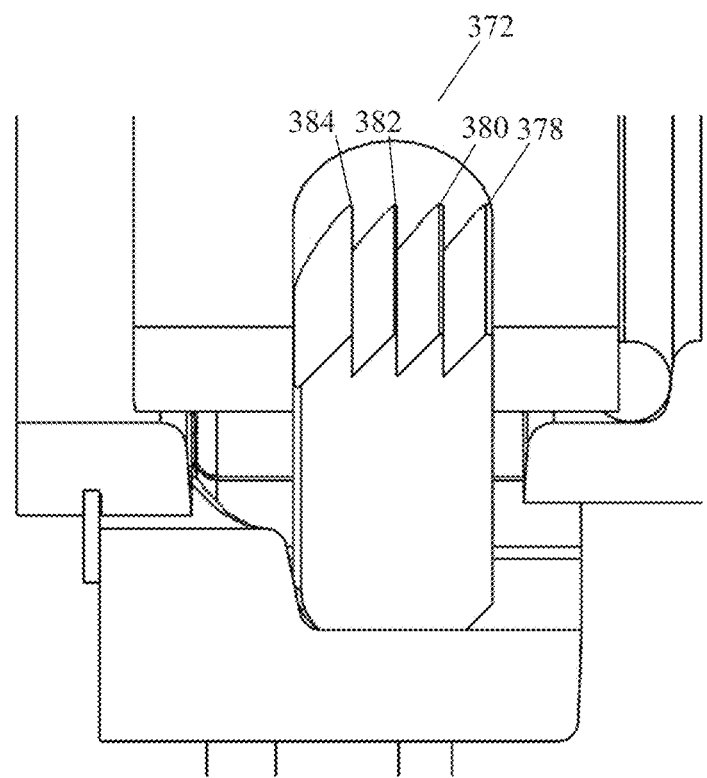
FIG. 29 shows a perspective view of gripper teeth, according to the embodiment of the pipe connector in FIG. 27.

FIG. 29 shows a perspective view of the plurality of gripper teeth 372. Shown in FIG. 29, the plurality of teeth 372 have increasing sharpness moving across the plurality of teeth 372 from one tooth to each adjacent tooth. A first end tooth 378 has a first degree of sharpness that is the dullest of all the teeth 372. The dull first end tooth 378 facilitates properly orienting the gripper 370 when the gripper 370 begins wedging against the pipe 19. A first middle tooth 380 is sharper than the first end tooth 378. A second middle tooth 382 is sharper than the first middle tooth 380, though it could also be the same sharpness as the first middle tooth 380. Two middle teeth are shown, though there could be more or less, each with the same sharpness or with increasing sharpness moving from one tooth to an immediately adjacent tooth in a direction away from the first end tooth 378. A second end tooth 384 has a sharpness greater than the first end tooth 378, the first middle tooth 380, and the second middle tooth 382. The increasing sharpness from each successive tooth facilitates reorientation on an increasingly fine scale, to properly orient the gripper 370 as the gripper teeth 372 gradually and increasingly bite against and/or into the pipe 19. When the pipe 19 is hard like ductile iron pipe, the teeth 372 flatten against the pipe 19 with increasing force, and when the pipe is softer, as with PVC pipe, the sharper teeth 372 cut into the surface of the pipe 19.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A cam ring for a pipe connector, comprising:
   a first axial side;
   a second axial side opposite the first axial side;
   a radially outward-facing side;
   a radially inward-facing side; and
   a cam element extending a circumferential length along a portion of the radially inward facing-side, the cam element including:
   a first cam section at a first end of the circumferential length, the first cam section having a first radially facing cam surface adjacent a first axially facing cam surface, the first radially facing cam surface having a first radial depth from the radially inward-facing side toward the radially outward-facing side, the first axially facing cam surface having a first axial location relative to the first axial side;
   a second cam section at a second end of the circumferential length, the second cam section having a second radially facing cam surface adjacent a second axially facing cam surface, the second radially facing cam surface having a second radial depth from the radially inward-facing side toward the radially outward-facing side, the second axially facing cam surface having a second axial location relative to the first axial side, the second radial depth less than the first radial depth, the second axial location closer to the first axial side than the first axial location.

2. The cam ring of claim 1, further comprising:
   a third cam section adjacent the first cam section, the third cam section having a third radially facing cam surface adjacent a third axially facing cam surface, the third axially facing cam surface having a third axial location, the third radially facing cam surface having a third radial depth sloping radially inward at a third depth slope; and
   a fourth cam section adjacent the third cam section, the fourth cam section having a fourth radially facing cam surface adjacent a fourth axially facing cam surface, the fourth radially facing cam surface having a fourth radial depth, the fourth axially facing cam surface having a fourth axial location shifting from the third cam section axially toward the first axial side,
   wherein the second radial depth of the second cam section slopes radially inward at a second depth slope.

3. The cam ring of claim 2, further comprising:
   a fifth cam section adjacent the fourth cam section, the fifth cam section having a fifth radially facing cam surface and a fifth axially facing cam surface, the fifth axially facing cam surface having a fifth axial location, the fifth radially facing cam surface having a fifth radial depth sloping radially inward at a fifth depth slope, the fifth depth slope being shallower than the second depth slope and the third depth slope.

4. The cam ring of claim 3, further comprising:
   a sixth cam section adjacent the fifth cam section and the second cam section, the sixth cam section having a sixth radially facing cam surface and a sixth axially facing cam surface, the sixth axially facing cam surface having a sixth axial location, the sixth radially facing cam surface having a sixth radial depth sloping radially inward at a sixth depth slope, the sixth depth slope being shallower than the second depth slope and the third depth slope.

5. A gripper for a pipe connector, comprising:
   a body having a first side, a second side adjacent the first side, a third side adjacent the first side and opposite the second side, and a fourth side adjacent the second side and the third side and opposite the first side, the second side having a hole;
   a retention tab positioned in and extending from the hole, the retention tab configured to break off under a force greater than the force of gravity on the gripper; and
   a plurality of teeth extending from the fourth side of the body, each of the teeth of the plurality of teeth having an arc shape to grip a cylinder;
   wherein the plurality of teeth comprises:
      a first tooth with a first degree of sharpness; and
      a second tooth with a second degree of sharpness, the second degree of sharpness greater than the first degree of sharpness.

6. The gripper of claim 5, wherein the plurality of teeth further comprises:
   a third tooth with a third degree of sharpness, the second tooth between the first tooth and the third tooth, and the third degree of sharpness greater than the second degree of sharpness.

7. The gripper of claim 6, wherein the plurality of teeth further comprises:
   a fourth tooth with a fourth degree of sharpness, the second tooth and the third tooth between the first tooth and the fourth tooth, and the fourth degree of sharpness greater than the third degree of sharpness.

* * * * *